US008981660B2

(12) United States Patent
Velasco Valcke

(10) Patent No.: US 8,981,660 B2
(45) Date of Patent: Mar. 17, 2015

(54) ELECTRONIC BALLAST

(71) Applicant: Panacea Quantum Leap Technology LLC, Dallas, TX (US)

(72) Inventor: Francisco Javier Velasco Valcke, Bogotá (CO)

(73) Assignee: Panacea Quantum Leap Technology LLC, Dallas, TX (US)

( * ) Notice: Subject to any disclaimer, the term of this patent is extended or adjusted under 35 U.S.C. 154(b) by 0 days.

(21) Appl. No.: 14/346,483

(22) PCT Filed: Sep. 22, 2012

(86) PCT No.: PCT/IB2012/055045
§ 371 (c)(1),
(2) Date: Mar. 21, 2014

(87) PCT Pub. No.: WO2013/042092
PCT Pub. Date: Mar. 28, 2013

(65) Prior Publication Data
US 2014/0232286 A1 Aug. 21, 2014

(30) Foreign Application Priority Data
Sep. 23, 2011 (CO) .................................. 11-124965

(51) Int. Cl.
H05B 37/02 (2006.01)
H05B 41/28 (2006.01)
(52) U.S. Cl.
CPC ................ *H05B 37/02* (2013.01); *H05B 41/28* (2013.01)
USPC .......................... 315/224; 315/219; 315/209 R
(58) Field of Classification Search
None
See application file for complete search history.

(56) References Cited

U.S. PATENT DOCUMENTS

| 5,381,076 | A | * | 1/1995 | Nerone ...................... 315/209 R |
| 5,416,388 | A | * | 5/1995 | Shackle ........................ 315/219 |
| 6,222,322 | B1 | * | 4/2001 | Stack ............................ 315/119 |
| 6,528,956 | B2 | * | 3/2003 | Barak ........................... 315/291 |
| 6,686,705 | B2 | * | 2/2004 | Nerone et al. ................ 315/291 |
| 6,784,622 | B2 |   | 8/2004 | Newman, Jr. et al. |

(Continued)

FOREIGN PATENT DOCUMENTS

| CN | 201509352 | 6/2010 |
| KR | 20040017102 | 2/2004 |
| WO | 2010055528 | 5/2010 |

OTHER PUBLICATIONS

International Search Report Issued in Coresponding Applicaiton No. PCT/IB2012/055045 on Apr. 17, 2013.

*Primary Examiner* — Crystal L Hammond
(74) *Attorney, Agent, or Firm* — Whiteford, Taylor & Preston, LLP; Joseph L. Morales

(57) ABSTRACT

The present invention discloses an electronic ballast for operating a gas discharge lamp which includes (i) a rectifier bridge circuit; (ii) a power factor correction (PFC) network that includes an electrolytic capacitor that charges by means of a circuit comprised by an inductor, diode and capacitor; and (iii) a switched inverter circuit that converts rectified DC voltage to a high frequency current AC voltage. The electronic circuit has a switch that switches on the aforementioned electronic elements making the (PFC) circuit consume energy continuously from the network, while the electrolytic capacitor remains connected to the voltage of the rectifier bridge, through the inductor and the diode, even if the inductor has no energy stored. From the storage capacitor the inverter is powered by a constant voltage and noise-free, allowing the inverter to power the luminous load properly.

16 Claims, 4 Drawing Sheets

(56) References Cited

U.S. PATENT DOCUMENTS

| | | | |
|---|---|---|---|
| 6,933,681 B2* | 8/2005 | Rudolph | 315/219 |
| 6,949,885 B2* | 9/2005 | Hamamoto et al. | 315/200 R |
| 7,187,136 B2* | 3/2007 | Fiorello | 315/224 |
| 7,291,988 B2* | 11/2007 | Hung | 315/291 |
| 7,429,833 B2* | 9/2008 | Peng et al. | 315/307 |
| 8,339,056 B1* | 12/2012 | Xiong et al. | 315/224 |
| 2004/0007986 A1* | 1/2004 | Parra et al. | 315/169.1 |
| 2004/0212318 A1* | 10/2004 | Hamamoto et al. | 315/200 R |
| 2006/0244392 A1 | 11/2006 | Taipale et al. | |
| 2009/0121639 A1* | 5/2009 | Giussani et al. | 315/119 |
| 2010/0039038 A1 | 2/2010 | Lam et al. | |
| 2010/0188008 A1* | 7/2010 | Vail | 315/224 |
| 2010/0194287 A1* | 8/2010 | Vivero-Flores et al. | 315/149 |
| 2011/0291577 A1* | 12/2011 | Anissimov | 315/224 |
| 2011/0304272 A1* | 12/2011 | Ng et al. | 315/127 |

* cited by examiner

ELECTRONIC BALLAST

1. FIELD OF THE INVENTION

The present invention relates to electronic ballasts for gas discharge lamps, such as fluorescent lamps.

2. DESCRIPTION OF THE STATE OF THE ART

Gas discharge lamps such as fluorescent lamps, generally include a ballast in their circuits, which in addition to generating the starting conditions of the lamp, is responsible for limiting the current to the load. The initial voltage or starting voltage is higher than the sustainability voltage; the ballast must be designed to handle various events, preserving the largest possible transfer of power to the load, with the most harmonious and appropriate treatment of the supply network and the lamp load. The impedance of the discharge lamp tends to an infinite value at shutdown conditions, but once the arc is generated when the gas is ionized inside the lamp, it changes of impedance until the lamp starts, wherein its impedance tends to zero, so that a current limiter element is incorporated between the network and the tube of the lamp, which is precisely the task performed by the ballast.

Electronic ballasts typically include a rectifier in order to change the voltage of alternate current (AC) to a voltage of direct current (DC) and a filter circuit for filtering the DC voltage. The filter circuit usually comprises an energy storage capacitor. Electronic ballasts also often use booster circuits to amplify the magnitude of the DC voltage. Additionally, there are ballasts that use means for power factor correction to reduce the total harmonic distortion of the ballast current input. These circuits, usually include a switching inverter to convert the DC voltage in a high frequency AC voltage, and a resonant circuit which has a relatively high impedance for coupling the high frequency AC voltage to the electrodes of the discharge lamp.

An important indicator of the quality of current for a gas discharge lamp is the current crest factor (CCF) of the current over the lamp. It is desirable to have a low CCF because a high CCF may result in deterioration of the filaments and consequent carbonation at the ends of the lamp and subsequently reduce the life thereof. Normally, in ballast circuits relatively large capacitors are used to minimize the ripple on the DC voltage, but this generates certain disadvantages to the circuit. The capacitor discharges as long as the voltage level is above the instantaneous value of the AC voltage, and thus the capacitor is charged only during a relatively short time in each half cycle of the line voltage. Therefore, ballasts of the state of the art take a relatively large amount of current during the short time in which the capacitor is charging. This results in a distorted input current waveform resulting in harmonics and levels of unwanted total harmonic distortion (THD).

In an AC power system, the current or voltage waveforms can be expressed as a fundamental and a series of harmonics. These harmonics have a certain frequency which is a multiple frequency of the fundamental frequency of the current or line voltage. Specifically, the distortion in AC waves has components which are integer multiples of the fundamental frequency. It is preferred that total harmonic distortion (THD) of the input current ballast is below 33.3% to avoid overheating of the neutral thread in three phase power systems. In most cases, it is desirable that the ballast have a total harmonic distortion of the ballast's input current below 20%.

One way to reduce total harmonic distortion (THD) of the input current of the ballast and improve the power factor of the ballast consists in the use of power factor correction circuits widely known. This approach has certain drawbacks, including the complexity of the ballast by the excessive number of components, higher costs, and high consumption. Another way to reduce total current harmonic distortion (THD) of the ballast input has been the use of a circuit that tries to fill the valleys of the signal generated between the rectifier and inverter. A disadvantage of this type of circuits is that they can have a greater oscillation, which results in an increased current crest factor (CCF), shortening the life of the lamp.

A prior art example that provides electronic ballasts that seek to provide a power factor and improved harmonic distortion (THD) is described in U.S. Patent Application US2010/0039038 entitled "Electronic ballast with a high power factor." This patent discloses a circuit that uses a switching element for the inverter stage formed by a type E inverter. When the switching element starts oscillating, the current flowing through the inductance L1 tries to oppose to the current changes, since this element tends to make the current circulate through the inverter circuit and diode D1. Such circuits often seek a temporary charge of a capacitor when discharged, in order to ensure the charge of the electrolytic capacitor C4. In this case, in the opening half cycle of the switching element, there is no voltage across the capacitor C2, allowing C2 to discharge to zero, which generates greater instability to the circuit by the use of the capacitor in one half cycle. In this circuit, given the capacitor is in a single half cycle, the circuit does not allow filtering net variations, which makes the circuit have a high ripple. This limits the value of the power, and in fact, the illustrated circuit operates with a 26 watt power lamp.

U.S. Pat. No. 6,784,622, entitled "Single switch electronic dimming ballast," discloses a ballast having an inverter circuit including a transformer with multiple secondary, one of which is used for repowering a high frequency level of the output of the storage capacitor in order to mitigate the valleys. The secondary windings are controlled by an electronic switch which at the same time shares the connection with an inverter circuit. The primary winding is controlled by a switch that belongs to a unit that has as a secondary winding that goes directly to the node 936 on the coil 42, capacitor 44 and the inverter. One of the transformers is connected through resistor 58 to the diode 54 to charge the capacitor 48. The capacitor 48 is charged positively via the resistor 58 to the diode 54 and its discharge is performed through the diode 52 to the circuit from the node located at the cathode of diode 840. The circuit configuration is inefficient during charge and discharge cycles of the capacitor as the capacitor is loaded on one wave half cycle, hence delivers voltage drops to zero at the half cycle where it is de-energized. The capacitor 48 allows decreasing part of the valley and rippling coming from the wave of the rectifier bridge, but the level of harmonic distortion (THD) rises significantly.

Therefore, a need exists in the art to provide design solutions that provide greater efficiency, lower THD and lower power factor.

3. BRIEF DESCRIPTION OF THE DRAWINGS

4. BRIEF DESCRIPTION OF THE INVENTION

The present invention discloses an electronic ballast for making a gas discharge lamp work which includes, in its preferred embodiment, (i) a rectifier circuit for converting an alternating current AC input voltage into a rectified voltage of direct current DC; (ii) a power factor correction (PFC) network which includes an electrolytic capacitor (or other energy storage device) that is loaded through a circuit conformed by an inductor, a diode and capacitor; and (iii) a switched inverter circuit that converts the rectified voltage of direct current to a high frequency alternating current, which has electrodes attached to the discharge lamps. The electronic circuit has a switching element that switches on the aforementioned elements making the PFC network consume power continuously following the supply voltage wave, while the electrolytic capacitor remains connected to the voltage of the rectifier bridge, through the inductor and diode, even if the inductor does not have energy stored. Once the switch is closed, it does not affect the charge of the capacitor, because it is isolated by the diode which in this case is inversely polarized; when the switch is opened, the inductor releases the stored energy through the diode over the capacitor that was already charged to a voltage level close to the bridge voltage. The power factor correction (PFC) network controls the charge of the capacitor and inductor alternatively, resulting in a permanent and harmonic consumption of the network energy. The inverter is powered by the storage capacitor with a relatively constant voltage and noise free which allows the luminous load to be properly powered.

The ballast further comprises a circuit for sensing the presence of lamps in the load circuit. The sensors are low-value resistors wherein a voltage drop is generated that identifies the values of the luminous load. The control is responsible for measuring the voltage levels at the low value resistors and, depending on the load, the duty cycle can be handled according to the system requirements. Consequently, the electronic ballast of the present invention can handle more than one gas discharge lamp with the maximum power transfer and greater efficiency.

5. DETAILED DESCRIPTION OF THE INVENTION

Figure 1:
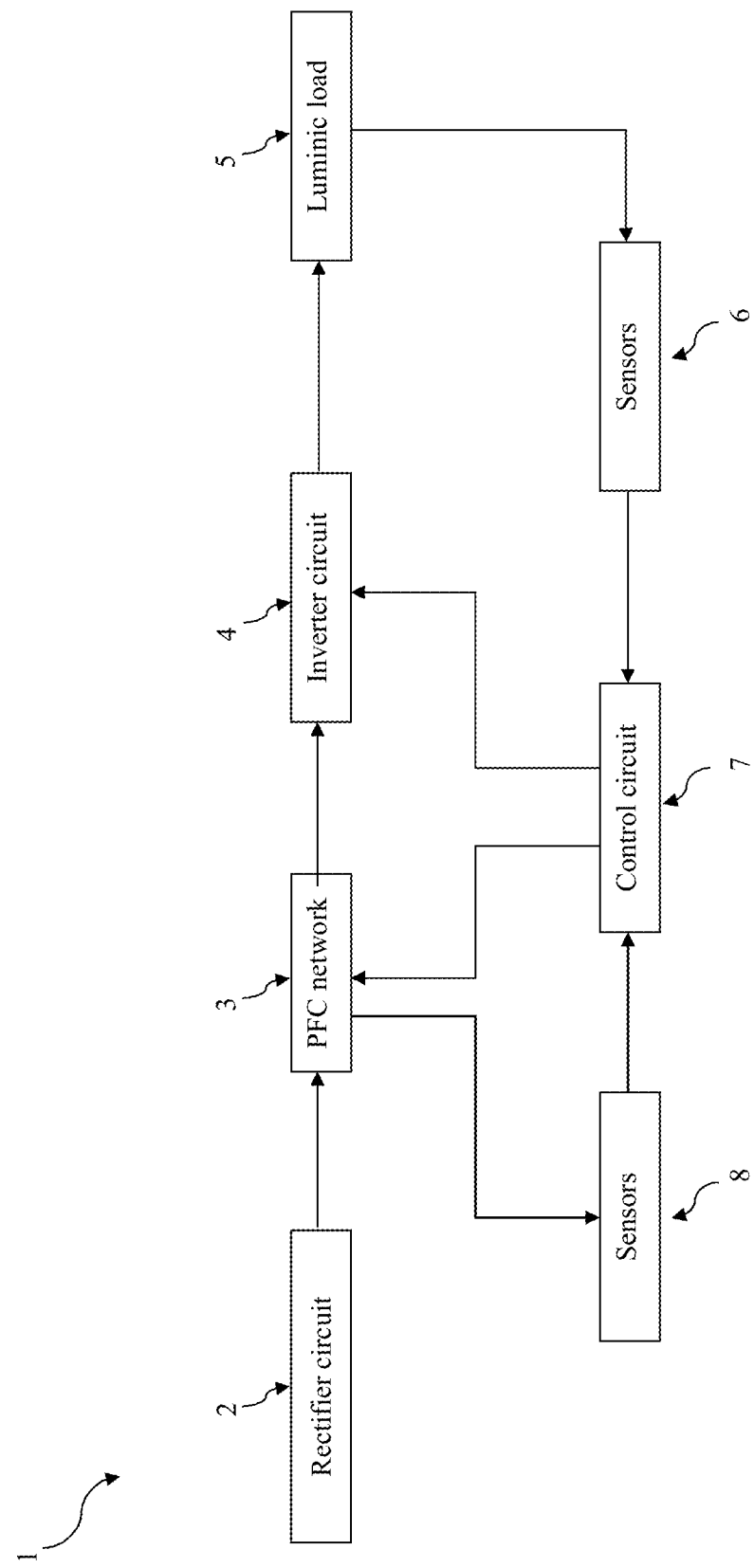
FIG. 1 is a simplified block diagram of an embodiment of the electronic ballast of the present invention.

Referring to FIG. 1, a simplified block diagram of the electronic stages of the electronic ballast (1) of the present invention is shown. The ballast (1) includes a rectifier circuit (2) connected to the network, usually an AC voltage at a frequency of 50 Hz or 60 Hz.

Whenever it says that a device is connected, coupled, coupled in relation to current or that it may be connected to another device, it means that the device can be directly connected by a wire or as an alternative, get connected through another device such as, but not limited to, a resistor, diode, conductor device, and this connection may be serial or parallel.

Returning to FIG. 1, the rectifier circuit (2) converts the AC input voltage into a full wave rectified voltage. The rectifier circuit (2) is connected to a power factor correction (PFC) network (3). The power factor correction (PFC) network (3) generates a delay action on the load of one of the components of the circuit to allow smoothing the valleys of the rectified wave. The output terminals of the PFC network (3) are connected in turn to an inverter circuit (4). The inverter circuit (4) converts the DC voltage into a high frequency rectified AC voltage. The output terminals of the inverter circuit (4) provide essentially a high frequency sinusoidal voltage, and a voltage gain for starting the discharge lamps (5).

The circuit (1) includes a series of sensors (6) over the current of luminous load (5) and sensors (8) on the PFC network (3), which provide information to the control circuit (7) of the load current to adjust the output power.

Figure 2:
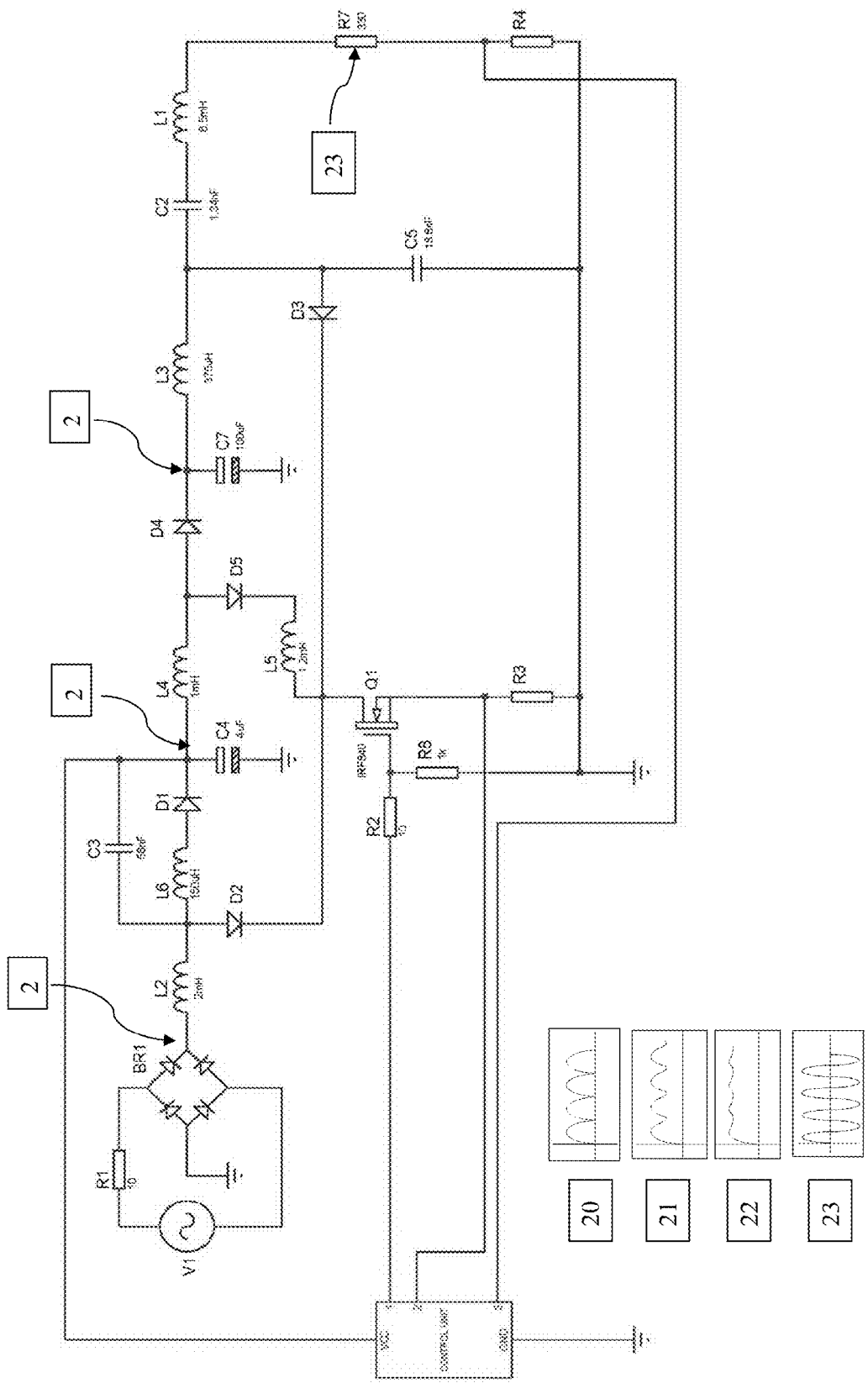
FIG. 2 is an electronic scheme of the preferred embodiment of the present invention.

Referring to FIG. 2, a schematic circuit of an embodiment of the present invention is shown with various PFC networks. The circuit is powered by an AC voltage source which is rectified by the rectifier bridge BR1. The rectified signal is shown with reference number 20, and it can be observed that it corresponds to a sine wave signal with very deep valleys. The first PFC stage, defined by the capacitor C3 which is connected in parallel to an inductor L6 which is also connected in serial to diode D1, and to an electrolytic storage and filter capacitor C4. The electronic circuit of this embodiment is switching by a switching element Q1, which allows control over the network PFC. The values and references of the elements in the figures are merely illustrative. They can be modified to optimize various design parameters.

It should be understood that the network that generates a PFC delay action over the load, may be comprised of an inductor L2 and diode D1 connected between the electrolytic capacitor C4 and the switching element Q1 through the diode D2, and in the same way generate a delay action over the load or over the next PFC stage.

In a first oscillation phase, where the switching element Q1 is open, there is a current flow from the positive node of the rectifier bridge to the first PFC stage (capacitor C3, inductor L6, diode D1 and the electrolytic capacitor C4). In a second oscillation phase, when the switching element Q1 is closed, the current flows from the positive node of the rectifier bridge BR1 through the inductor L2, diode D2 and switching element Q1 to ground. The current that flows through the inductor L2 once the switching element Q1 is opened, tends to remain flowing over it, because the inductor L2 stores enough power in the magnetic field to ensure that no current flows via diode D2, and on the contrary, it flows over the circuit formed by the capacitor C3, inductor L6 and diode D1, thus loading the electrolytic capacitor C4.

The switch element Q1 may be a metal-oxide-semiconductor field-effect transistor (MOSFET), but may also be a bipolar junction transistor (BJT), or an insulated-gate bipolar transistor (IGBT) or other common controllably conductive devices.

In the first PFC network (capacitor C3, inductor L6, diode D1 and electrolytic capacitor C4), the configuration of capacitor C3 and inductor L6 generates a delay over the action of the electrolytic capacitor C4 compared to the moment it closes and opens the switching element Q1, since the capacitor C3 (in the electric field) and the inductor L6 (in the magnetic field) alternatively store energy for a short period of time. This configuration of electronic elements tends to offset the discharge action of the electrolytic capacitor C4 in time compared to the initial charge action of the same capacitor C4. Thanks to the offset generated by reactive elements L6, C3 and diode D1, in their respective fields (magnetic and electric), it has provided a continuous power source over the electrolytic capacitor C4 at all times.

The L6 and C3 elements introduce a delay or phase difference in the action of switch Q1 for the load over C4, which is one of the essential elements in the filter to prevent rippling.

As mentioned above, when the switching element Q1 is opened, inductor L2 discharges the energy stored through D1 over C4 leaving the circuit permanently connected. The delay allows the circuit to provide power stability for the moments when the load requires electric power; in particular inductor L2 and rectifier BR1 provide load capacity to capacitor C4 and thus to supply the requirements of the circuit. This generates greater stability to the output voltage of the discharge lamp; provides lower fluctuations, and provides minor harmonics, all of this with the action of a single switching element Q1. This effect can be reflected in the output node of the PFC circuit shown with reference number 21, where a smoother and filtered signal is shown, compared to the output signal in the positive node of BR1 shown with the reference number 20.

The circuit of the present invention allows the handling of multiple PFC network stages with their respective inverter circuits and only one switch Q1 at the same time, thanks to the delays provided by the PFC networks. Also, additional L-C branches may be placed with different discharge lamps with different power load in a serial or parallel connection, dimensioning the switching element Q to the requirements of the new equivalent network. RC values should be calculated so that the harmonic response is the lowest, and the power factor is the highest. In most cases, the sizing of new stages requires the setting of electrolytic capacitor C4 to a lower value and the use of a second electrolytic capacitor C7 (following FIG. 2) in a second stage with a higher value, looking for a lower level of harmonic distortion and power factor close to 1.

The embodiment illustrated in FIG. 2 has two PFC stages. The first stage is connected in series to the second stage through the joining point with the storage and filtering electrolytic capacitor C4. The first stage provides a pre-filtered voltage of the correction circuit (Boost type circuit) conformed by inductors L4, L5, diode D5 and capacitor C7. In the second stage, the inductor L5 generates a new delay in the action over the anode of diode D5, offsetting the response compared to the previous stage. This configuration allows, with a single switching element, to handle two different stages: i) the PFC network, and ii) the inverter circuits. Also, as a skilled person can observe, the switching element may act on additional stages that contribute to filtering, power factor correction and improved harmonic response.

When the present invention states that a part of the circuit is a Boost-type circuit, it should be understood that this corresponds to a rectifier bridge that goes through an inductor and is switched by a semiconductor switch. In the second stage of the circuit shown in FIG. 2, when the switch Q1 is closed, the current flow occurs through the inductor L4, the switch Q1 through the inductor L5, which enables the charge of the electrolytic capacitor C7. Once the switch Q1 opens, the remaining current in L4 provides the remaining energy in its magnetic field passing it to the inverter circuit. The configuration of the second PFC stage provides a delay in the action of the electrolytic capacitor C7 compared with the time the switching element Q1 closes and opens. This configuration of elements offset the discharge action of the electrolytic capacitor C7 in time relative to the initial charge of the same capacitor C7. In the same way as the delay in the first stage PFC, in this second stage the reactive element L4 and diode D4 provide continuous power over the electrolytic capacitor C7 at all times, in other words, generating a DC condition on the PFC circuit with lower ripple than the one in C4 and providing much greater stability. This can be seen in the connecting node of the capacitor C7 represented by reference number 22, wherein a signal is shown with shallower deeper valleys than those present at previous point 21.

Another feature of the present invention is that the circuit never loses power and instead, the circuit is permanently connected under DC conditions. That is, in the switching of the switching element Q1 the circuit will always be electrically supported by: i) the rectifier circuit when the switch has not yet entered into oscillation, and ii) due to the L-C configuration of the PFC network at the time in which the switch after closing the switch, it is then opened. In the time interval in which the switch Q1 does not operate, the capacitor C4 is preloaded from the full wave bridge rectifier BR1 through inductor L6 and diode D1. Specifically, the electrolytic capacitor C4 receives a DC voltage value corresponding to the value of the voltage at the positive node of the full wave rectifier BR1. Thus, when the switch Q1 is closed, the capacitor C4 has a load that is not affected by the closing of switch Q1, thanks to the diode D1. And at the time the switch Q1 is opened, the electrolytic capacitor C4 is still receiving the electric support of elements L6-C3 connected in series therewith. This allows the circuit to reduce the level of harmonics and provide higher power.

Continuing with FIG. 2, the last stage connected to the output of the second PFC network, consists in a capacitor C2 and an inductor L1 in series that provide a high frequency voltage to operate one or more discharge lamps. In the present embodiment, R7 represents the discharge lamp and R3 represents a sensing resistor that will provide load information to the control circuit as will be described later. The high frequency voltage can be displayed on the discharge lamp R7 represented by reference number 23.

The circuit of the present invention provides the advantage that, in the event that the load or the discharge lamp is removed, there would not consumption since the circuit only requires the connection of the two terminals of the lamp, and not the four terminals as the prior art does. If it were to break the filament of the discharge lamp, the lamp does not turn off, but will be kept on, because the filaments are not a required passage in the circuit. This also provides the possibility of increasing the duty cycle by changing the output voltage of the load lifting it during boot time and after a while the voltage is lowered to the maintenance voltage, by modifying the duty cycle or frequency signal or a combination of both.

The circuit of the present invention provides a conventional control module for monitoring the presence of lamps in the system, detecting the load impedance and thus provides the voltage required for booting and maintenance. The control module can take the decision based on a program to increase the duty cycle with a specified or programmed time to ensure the booting of the discharge lamp. Once the control module detects the booting thanks to the current sensor, it adjusts the duty cycle and/or frequency to the condition of maintenance complying with the maximum power transfer to the lamp. The control module can be configured in a mode called "displacement modulation," which is nothing but the variation of pulse width and frequency.

The control module can be any type of electronic controller with programming features, analog and digital inputs and outputs. Preferably, the control modules can be comprised by integrated circuits called PSoC levels 3 or 5, or SmartFusion integrated circuits. This module, based on the current feedback signal of the load, the current through the switch Q1 and the input voltage over the electrolytic capacitor C4, takes a decision as to whether the lamp has started or not. In the preferred embodiment shown in FIG. 2, the control module may vary the duty cycle from 22% to 66% to boot the lamp and can even vary the frequency of the oscillator that powers the gate of the switch Q1, to contribute the boot. In this embodiment, the maintenance frequency is approximately 55 kHz and the duty cycle between 22% and 33% for the maintenance condition. The change in frequency is done so that the output voltage over the discharge lamp R7 goes to the maintenance level, or auto-tuning for different lamp references.

As mentioned before, the control module can increase the duty cycle, and also change the frequency to increase the output voltage over the load and turn it on. The module allows the booting of any type of lamp depending on the maintenance load voltage detecting the change in impedance, so that the duty cycle can be modified, and the output voltage on the load voltage support can be increased or decreased. The control module is able to determine what kind of load is present, when comparing within its operating parameters, if the current through the sensing resistor R4 corresponds to a set voltage range.

The control module analyzes the load current through the sensor element R4, and the voltage across the electrolytic capacitor C4 and based on these feedback values determine the output power by adjusting the voltage and changing the duty cycle, trying not to deform the current waveform in order to not to increase the harmonics of the system. If the control module cannot read the presence of load for a while, the module increases the duty cycle, and can even change the frequency to be sufficient to generate the boot. The sensor element R4, that have just sensed, sends the booting signal due to an increase in current and the control module makes the necessary adjustments in duty cycle and frequency for the system to operate properly in sustaining or maintenance. Then, the control module compares the settings in the duty cycle and frequency generated for the booting of the lamp with information contained within the module and determines what type of lamp is connected to the circuit (for example, the circuit can determine if a lamp corresponds to the group T8 of 32 watts, or a T8 lamp of 17 watts, or a lamp F40 T12 of 40 watts, etc.), making the necessary adjustments to optimize the values of voltage, harmonic distortion (THD) and power factor for each type of load connected.

Figure 3:
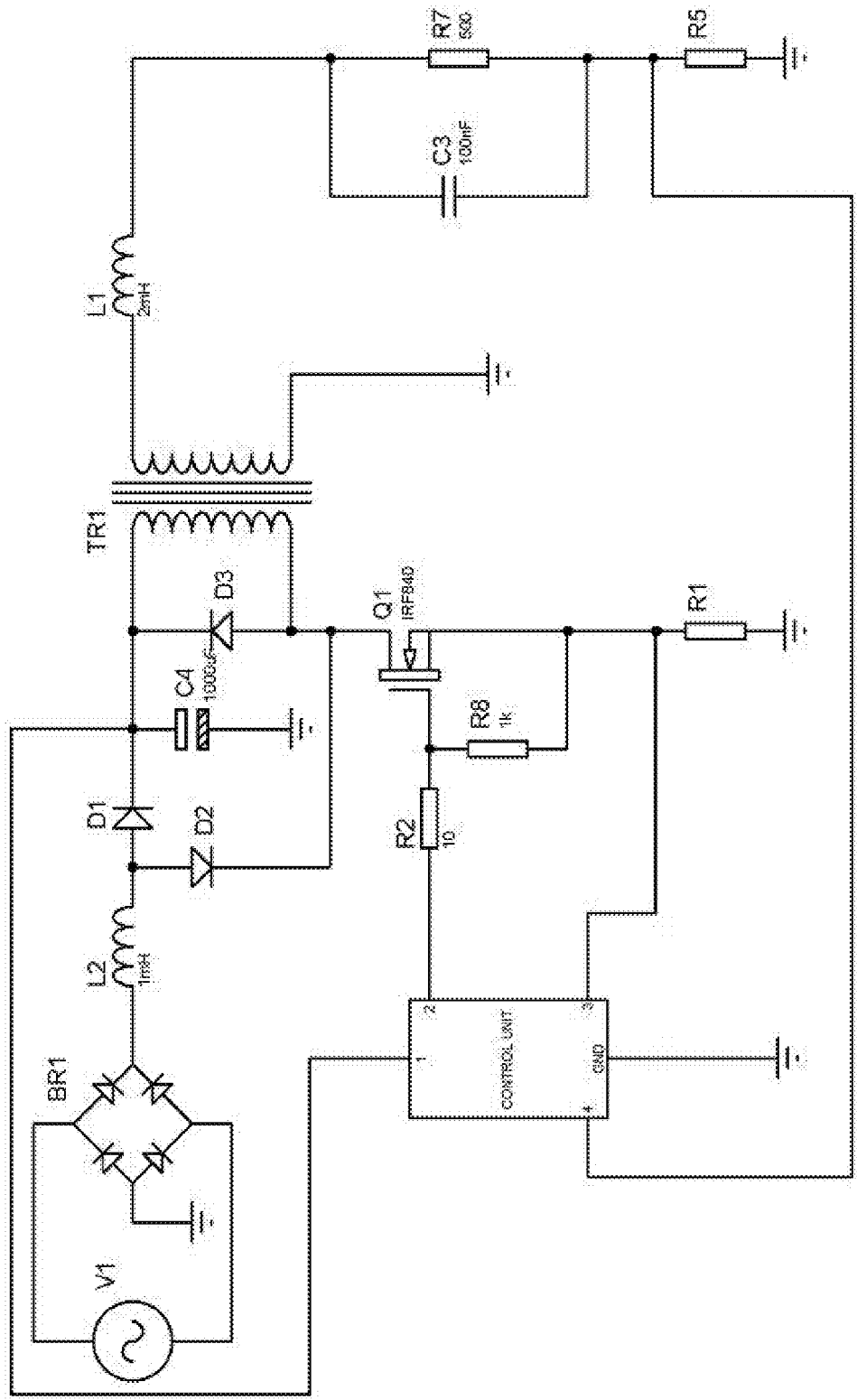
FIG. 3 is an electronic scheme of a variation of the preferred embodiment of the present invention.

Referring to FIG. 3, another embodiment of the circuit of the present invention is described, wherein the inductor TR1 is present for amplification purposes and circuit protection (flyback type). The electrolytic capacitor C4 is isolated from the positive node of the rectifier bridge BR1, allowing that when the switching element Q1 is closed, a way to the positive node of the bridge is generated through L2, D2, switch Q1 and ground. In the other half cycle, when switch Q1 is opened, the electrolytic capacitor C4 is charged through D1 and discharged through the circuit, disabling the discharge through diode D1 by means of the oppositely polarized. In the inverse stage, the capacitor C3 represents an element for signal filtering purposes on the load, but is optional and may or may not go in parallel with the load. Additionally, the ballast circuit detects the state (ON/OFF) of the lamp R7 which is connected in series through R5. If any current that represents the lamp ignition is detected, the circuit through R5 and the control unit, increases rapidly the duty cycle for a short period in order for the lamp to be energized and change the impedance characteristics making the current to be increased and be detected by R5 to bring the signal to the control unit. Then, the control module lowers the duty cycle to a level that allows the voltage decrease to the point of maintenance.

When switch Q1 is opened and closed, a residual current appears which allows the voltage over the electrolytic capacitor C4 rise, generating a voltage multiplier depending on the duty cycle that is being handled by the circuit. In the event that the duty cycle is very low, the control module gives time to the capacitor to discharge. Conversely, if the duty cycle is high (for example more than 66%), the circuit does not allow the complete discharge of the capacitor. When a high duty cycle is used, the voltage in C4 is high. When the voltage in each of the resonant circuit branches is almost zero, the voltage across each reactance is very high, and allows the lamp to boot. Once the lamp is booted, the branch leaves the resonance condition and generates a change of coupling in order to generate the maintenance voltage.

Figure 4:
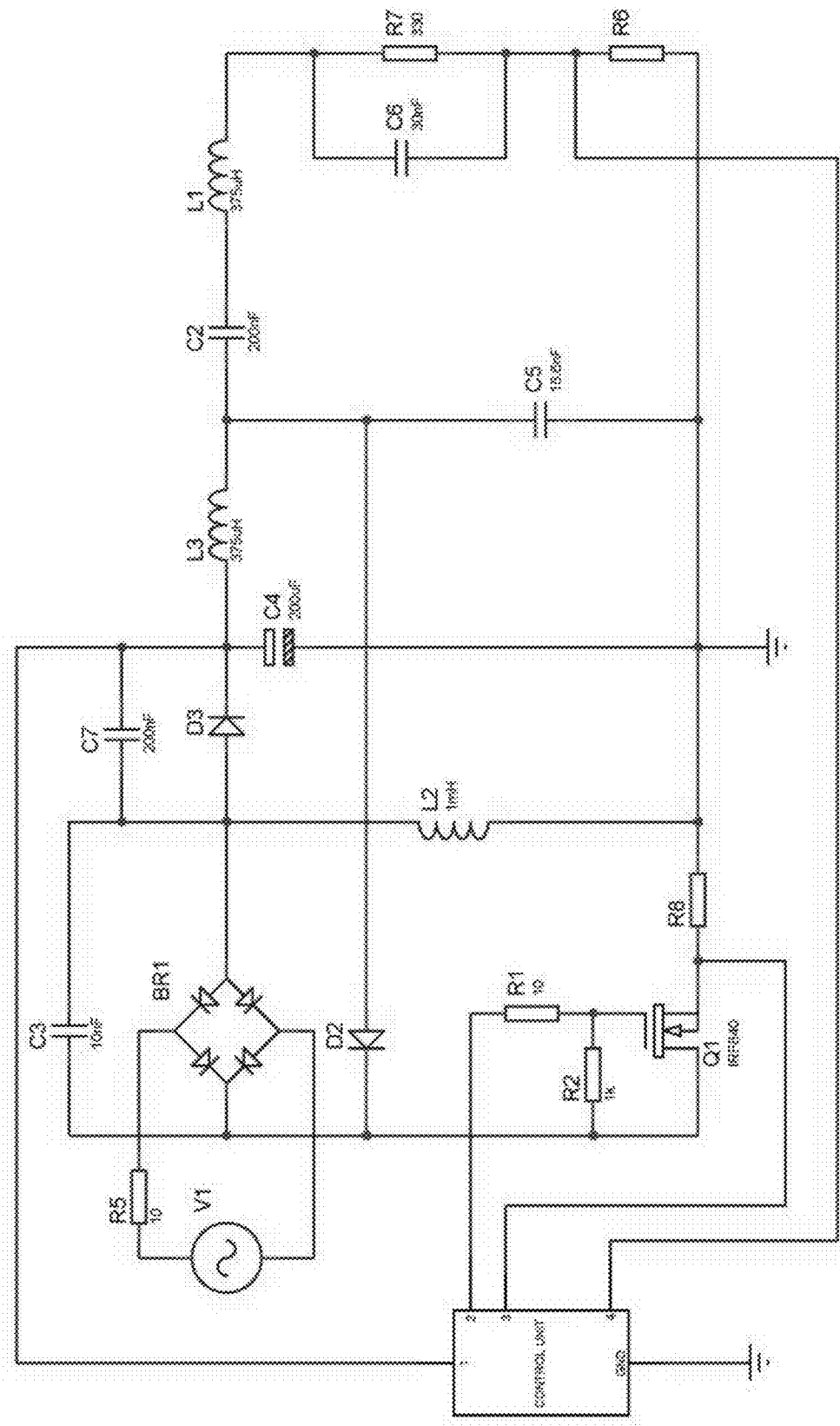
FIG. 4 is an electronic scheme of a variation of the preferred embodiment of the present invention.

Referring to FIG. 4, another embodiment of the circuit of the present invention is described. In this circuit, resistors R6 and R8 are low value resistors that generate a low drop voltage value to sense current on lamp R7. They read the variations that may occur in the load voltage. The positive node of the rectifier bridge is connected to the drain of the switch. Diode D3 is inversely connected in such a way that prevents the flow of current through the inverter bridge. The inverter has the switch Q1 as the switch element which is isolated by diode D2 from the rest of the circuit. This configuration is a class E inverter that has a capacitor C6 in parallel with the load R7, which by its setting filters eddy currents and improves the response of the circuit.

It must be understood that this invention is not limited to the embodiments described and illustrated above. A person skilled in the art will understand that numerous variations and modifications can be carried out that do not depart from the spirit of the invention, which is only defined by the following claims.

The invention claimed is:

1. An electronic circuit for operating discharge lamps, comprising:
   a—a rectifier bridge connected to an AC power source;
   b—a power factor correction (PFC) network connected to the output of the rectifier bridge, which contains a storage and filtering capacitor;
   c—an inverter connected to the output of the PFC network, containing a switching element;
   d—a control module that receives and processes current signals from the discharge lamp current and the voltage over the storage and filtering capacitor, in order to control the switching element;
   wherein the PFC network and the inverter share the switching element; and
   wherein the storage and filtering capacitor is permanently connected to the rectifier bridge under DC conditions.

2. The electronic circuit of claim 1, wherein the circuit has a plurality of PFC networks sharing the same switching element.

3. The electronic circuit of claim 1, wherein the circuit has a plurality of inverters that share the same switching element.

4. The electronic circuit of claim 1, wherein the PFC network comprises an inductor and a diode connected between the storage and filtering capacitor, and through another diode, to the switching element.

5. The electronic circuit of claim 4, wherein the PFC network further includes an offset circuit.

6. The electronic circuit of claim 4, wherein the offset circuit is an electrolytic capacitor.

7. The electronic circuit of claim 1, wherein the load is in series with the output of the inverter.

8. The electronic circuit of claim 1, wherein the inverter is a flyback type inverter circuit.

9. The electronic circuit of claim 1, wherein the inverter is a resonant Class E inverter.

10. The electronic circuit of claim 1, wherein the switching element is a transistor.

11. The electronic circuit of claim 1, wherein the inverter circuit is a resonant inverter.

12. The electronic circuit of claim 1 wherein the switching element, the discharge lamp and the storage and filtering capacitor are connected to low value resistors which operate as current sensors.

13. The electronic circuit of claim 1, where the rectifier bridge is isolated from the storage and filtering capacitor through a diode.

14. The electronic circuit of claim 1, wherein the switching effect of the switching element increases the voltage charge of the storage and filtering capacitor.

15. The electronic circuit of claim 1, wherein the storage and filtering capacitor always receives positive voltage when the switching element is opened.

16. The electronic circuit of claim 1, wherein the discharge lamps are fluorescent lamps.

\* \* \* \* \*